(12) United States Patent
Marinier et al.

(10) Patent No.: US 10,631,283 B2
(45) Date of Patent: *Apr. 21, 2020

(54) METHOD AND APPARATUS FOR UTILIZING MULTIPLE CARRIERS IN HIGH SPEED PACKET ACCESS COMMUNICATIONS TECHNICAL FIELD

(71) Applicant: INTERDIGITAL PATENT HOLDINGS, INC., Wilmington, DE (US)

(72) Inventors: Paul Marinier, Brossard (CA); Diana Pani, Montreal (CA); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,304

(22) Filed: Jun. 11, 2018

(65) Prior Publication Data

US 2018/0295610 A1 Oct. 11, 2018

Related U.S. Application Data

(63) Continuation of application No. 15/369,233, filed on Dec. 5, 2016, now Pat. No. 10,021,680, which is a
(Continued)

(51) Int. Cl.
*H04W 28/04* (2009.01)
*H04W 72/04* (2009.01)
(Continued)

(52) U.S. Cl.
CPC ......... *H04W 72/042* (2013.01); *H04B 1/707* (2013.01); *H04L 1/04* (2013.01);
(Continued)

(58) Field of Classification Search
CPC ............ H04W 72/042; H04W 72/1273; H04B 1/707; H04L 1/04; H04L 1/1893; H04L 5/0044; H04L 5/0053
(Continued)

(56) References Cited

U.S. PATENT DOCUMENTS

| 4,797,879 | A | * | 1/1989 | Habbab | ............... | H04J 14/0227 370/425 |
| 8,200,252 | B2 | | 6/2012 | Lee et al. | | |

(Continued)

FOREIGN PATENT DOCUMENTS

| CN | 1748435 A | 3/2006 |
| EP | 1758273 A1 | 2/2007 |

(Continued)

OTHER PUBLICATIONS

3rd Generation Partnership Project (3GPP), R1-080165, "Basic Physical Layer Consideration for Enhanced DL in CELL_FACH State for 1.28Mcps TDD", ZTE, RITT, CATT, TD-TECH, Spreadtrum Communications, 3GPP TSG-RAN WG1 Meeting #51bis, Sevilla, Spain, Jan. 14-18, 2008, 2 pages.

(Continued)

*Primary Examiner* — Sai Ming Chan
(74) *Attorney, Agent, or Firm* — Condo Roccia Koptiw LLP

(57) ABSTRACT

A method and an apparatus for utilizing multiple carriers are disclosed. A wireless transmit/receive unit (WTRU) capable of receiving on a single downlink carrier at a time may tune the receiver to one downlink carrier and switch the downlink carrier in accordance with a configured pattern. The WTRU may switch the carrier from an anchor carrier to a non-anchor carrier at a high speed shared control channel (HS-SCCH) sub-frame boundary, and switches back at an end of a subsequent high speed physical downlink shared channel (Continued)

(HS-PDSCH) subframe. The WTRU may switch the carrier at an HS-PDSCH sub-frame boundary. A WTRU capable of receiving on multiple downlink carriers simultaneously may tune the receiver to an anchor carrier and a supplementary carrier, and switch the supplementary carrier to another carrier based on a carrier switching order. The carrier switching order may be received via an HS-SCCH or via layer 2 signaling.

20 Claims, 6 Drawing Sheets

Related U.S. Application Data continuation of application No. 14/817,988, filed on Aug. 4, 2015, now Pat. No. 9,549,402, which is a continuation of application No. 14/315,388, filed on Jun. 26, 2014, now Pat. No. 9,137,792, which is a continuation of application No. 13/630,285, filed on Sep. 28, 2012, now Pat. No. 8,804,524, which is a continuation of application No. 12/610,284, filed on Oct. 31, 2009, now Pat. No. 8,305,998.

(60) Provisional application No. 61/110,118, filed on Oct. 31, 2008.

(51) Int. Cl.
| | |
|---|---|
| *H04B 1/707* | (2011.01) |
| *H04L 1/18* | (2006.01) |
| *H04L 5/00* | (2006.01) |
| *H04W 72/12* | (2009.01) |
| *H04L 1/04* | (2006.01) |
| *H04W 84/04* | (2009.01) |

(52) U.S. Cl.
CPC .......... *H04L 1/1893* (2013.01); *H04L 5/0044* (2013.01); *H04L 5/0053* (2013.01); *H04W 72/1273* (2013.01); *H04L 5/0012* (2013.01); *H04W 72/1289* (2013.01); *H04W 84/042* (2013.01)

(58) Field of Classification Search
USPC .......................................................... 370/329
See application file for complete search history.

(56) References Cited

U.S. PATENT DOCUMENTS

| | | | |
|---|---|---|---|
| 8,305,998 | B2 | 11/2012 | Marinier et al. |
| 8,358,281 | B2 | 1/2013 | McCullough et al. |
| 8,385,281 | B2 | 2/2013 | Pan et al. |
| RE44,203 | E | 5/2013 | Chun et al. |
| 8,705,461 | B2 | 4/2014 | Bala et al. |
| 9,094,957 | B2 | 7/2015 | Bala et al. |
| 9,788,311 | B2 | 10/2017 | Bala et al. |
| 2003/0123470 | A1 | 7/2003 | Kim et al. |
| 2004/0224697 | A1 | 11/2004 | Hakkinen et al. |
| 2005/0015703 | A1 | 1/2005 | Terry et al. |
| 2005/0036474 | A1 | 2/2005 | Zhang et al. |
| 2005/0221861 | A1 | 10/2005 | Zeira |
| 2006/0056360 | A1 | 3/2006 | Parkvall et al. |
| 2006/0221883 | A1 | 10/2006 | Damnjanovic et al. |
| 2006/0240831 | A1* | 10/2006 | Toskala ............. H04W 36/0055 455/436 |
| 2006/0274712 | A1 | 12/2006 | Malladi et al. |
| 2007/0049305 | A1 | 3/2007 | Bachl et al. |
| 2008/0004008 | A1* | 1/2008 | Nicol ................ H04W 52/0229 455/434 |
| 2008/0132230 | A1 | 6/2008 | Marinier et al. |
| 2008/0186892 | A1 | 8/2008 | Damnjanovic |
| 2008/0225783 | A1 | 9/2008 | Wang et al. |
| 2008/0273479 | A1 | 11/2008 | Kwak et al. |
| 2009/0067378 | A1 | 3/2009 | Luo et al. |
| 2009/0088148 | A1 | 4/2009 | Chung et al. |
| 2009/0154607 | A1 | 6/2009 | Lindoff et al. |
| 2009/0209247 | A1 | 8/2009 | Lee et al. |
| 2009/0245212 | A1 | 10/2009 | Sambhwani et al. |
| 2009/0316659 | A1 | 12/2009 | Lindoff et al. |
| 2010/0120442 | A1 | 5/2010 | Zhuang et al. |
| 2010/0189022 | A1 | 7/2010 | Pelletier et al. |
| 2011/0081856 | A1 | 4/2011 | Johansson et al. |
| 2011/0141878 | A1 | 6/2011 | Che et al. |
| 2011/0143796 | A1 | 6/2011 | Lee et al. |
| 2011/0243090 | A1 | 10/2011 | Grovlen et al. |
| 2012/0093097 | A1 | 4/2012 | Che et al. |
| 2013/0028123 | A1 | 1/2013 | Marinier et al. |
| 2013/0142178 | A1* | 6/2013 | Kim ................... H04W 72/042 370/336 |
| 2015/0103715 | A1* | 4/2015 | Chen ..................... H04L 5/001 370/311 |

FOREIGN PATENT DOCUMENTS

| | | | |
|---|---|---|---|
| GB | 2439367 | A | 12/2007 |
| JP | 2008-538061 | A | 10/2008 |
| JP | 2009-506635 | A | 2/2009 |
| JP | 2010-515985 | A | 5/2010 |
| JP | 2010-532962 | A | 10/2010 |
| TW | 200507564 | A | 2/2005 |
| TW | 200826700 | A | 6/2008 |
| TW | 200850019 | A | 12/2008 |
| TW | 200904213 | A | 1/2009 |
| WO | WO 2002/035873 | A2 | 5/2002 |
| WO | WO 2005/104503 | A2 | 11/2005 |
| WO | WO 2008/014275 | A2 | 7/2006 |
| WO | WO 2006/126079 | A2 | 11/2006 |
| WO | WO 2008/083921 | A1 | 7/2008 |
| WO | WO 2008/112314 | A1 | 9/2008 |
| WO | WO 2008/114977 | A1 | 9/2008 |
| WO | WO 2008/157692 | A2 | 12/2008 |
| WO | WO 2009/025525 | A1 | 2/2009 |
| WO | WO 2010/070197 | A1 | 6/2010 |

OTHER PUBLICATIONS

3rd Generation Partnership Project (3GPP), R1-082249, "Text Proposal for DC-HSDPA Assumptions and Standards Impact", Ericsson, QUALCOMM Europe, 3GPP TSG-RAN WG1 Meeting #53, Kansas City, MO, USA, May 5-9, 2008, 19 pages.

3rd Generation Partnership Project (3GPP), R1-082468, "Carrier Aggregation in LTE-Advanced", Ericsson, TSG-RAN WG1 #53bis, Warsaw, Poland, Jun. 30-Jul. 4, 2008, 6 pages.

3rd Generation Partnership Project (3GPP), R1-082532, "Control Channel Support for HSDPA Dual-Cell Operation", Philips, NXP, 3GPP TSG RAN WG1 Meeting #53bis, Warsaw, Poland, Jun. 30-Jul. 4, 2008, 6 pages.

3rd Generation Partnership Project (3GPP), R1-082824, "DC-HSDPA and CPC: Outstanding Issues", Qualcomm Europe, 3GPP TSG-RAN WG1 #54, Aug. 18-22, 2008, 3 pages.

3rd Generation Partnership Project (3GPP), R1-082848, "General Control Channel Design for LTE-A", ZTE, 3GPP TSG-RAN WG1 #54, Jeju, Korea, Aug. 18-22, 2008, 3 pages.

3rd Generation Partnership Project (3GPP), R1-082946, "Carrier Aggregation and Control Signaling for LTE-A", LG Electronics, 3GPP TSG RAN WG1 #54, Jeju, Korea, Aug. 18-22, 2008, 5 pages.

3rd Generation Partnership Project (3GPP), R1-082995, "Transport Block Mapping and PDCCH Signaling for Carrier Aggregation", Panasonic, 3GPP TSG-RAN WG1 Meeting #54, Jeju, Korea, Aug. 18-22, 2008, pp. 1-3.

3rd Generation Partnership Project (3GPP), R1-083193, "Carrier Aggregation Operation in LTE-Advanced", Qualcomm Europe, 3GPP TSG RAN WG1 #54, Jeju, S. Korea, Aug. 18-22, 2008, pp. 1-4.

3rd Generation Partnership Project (3GPP), R1-083232, "Carrier Aggregation for LTE-A : E-NodeB Issues", Motorola, 3GPP TSG RAN1#54, Jeju, Korea, Aug. 18-22, 2008, 4 pages.

(56) References Cited

OTHER PUBLICATIONS

3rd Generation Partnership Project (3GPP), R1-083313, "Introducing Dynamic Carrier Switching in DC-HSDPA", Qualcomm Europe, 3GPP TSG-RAN WG1 #54, Aug. 18-22, 2008, pp. 1-5.
3rd Generation Partnership Project (3GPP), R1-083399, "Introduction of Dual-Cell HSDPA Operation on Adjacent Carriers", Ericsson, Huawei, Nokia, Nokia Siemens Networks, Philips, Qualcomm Europe, 3GPP TSG-RAN WG1 Meeting #54, Jeju, Korea, Aug. 18-22, 2008, 7 pages.
3rd Generation Partnership Project (3GPP), R1-083528, "Issues on Carrier Aggregation for Advanced E-UTRA", Texas Instruments, 3GPP TSG RAN WG1 54bis, Prague, Czech Republic, Sep. 29-Oct. 3, 2008, pp. 1-6.
3rd Generation Partnership Project (3GPP), R1-083580, "CQI Reporting Procedure for DC-HSDPA", Huawei, 3GPP TSG-RAN WG1 #54bis, Prague, Czech Republic, Sep. 29-Oct. 3, 2008, 4 pages.
3rd Generation Partnership Project (3GPP), R1-083681, "DL Layered Control Signal Structure in LTE-Advanced", NTT DoCoMo, 3GPP TSG RAN WG1 Meeting #54bis, Prague, Czech Republic, Sep. 29-Oct. 3, 2008, 7 pages.
3rd Generation Partnership Project (3GPP), R1-083705, "PDCCH on Carrier Aggregation", Huawei, 3GPP TSG RAN WG1 Meeting #54bis, Prague, Czech Republic, Sep. 29-Oct. 3, 2008, 3 pages.
3rd Generation Partnership Project (3GPP), R1-083706, "DL/UL Asymmetric Carrier Aggregation", Huawei, 3GPP TSG-RAN-WG1 Meeting #54bis, Prague, Czech Republic, Sep. 29-Oct. 3, 2008, 4 pages.
3rd Generation Partnership Project (3GPP), R1-083730, "L1 Control Signaling with Carrier Aggregation in LTE-Advanced", Nokia, Nokia Siemens Networks, 3GPP TSG-RAN WG1 Meeting #54bis, Prague, Czech Republic, Sep. 29-Oct. 3, 2008, 6 pages.
3rd Generation Partnership Project (3GPP), R1-083733, "Algorithms and Results for Autonomous Component Carrier Selection for LTE-Advanced", Nokia Siemens Networks, Nokia, 3GPP TSG RAN WG1 #54bis Meeting, Prague, Czech Republic, Sep. 29-Oct. 3, 2008, 5 pages.
3rd Generation Partnership Project (3GPP), R1-084474, "Support of Wider Bandwidth for LTE-Advanced", Nortel Networks, TSG-RAN1 #55, Prague, Czech, Nov. 10-14, 2008, 10 pages.
3rd Generation Partnership Project (3GPP), R1-090084, "Downlink Data and Control Structure for LTE-A", ZTE, 3GPP TSG-RAN WG1 #55bis, Ljubljana, Slovenia, Jan. 12-16, 2009, 4 pages.
3rd Generation Partnership Project (3GPP), R1-090280, "Issues on Carrier Aggregation for Advanced E-UTRA", Texas Instruments, 3GPP TSG RAN WG1 #55bis, Ljubljana, Slovenia, Jan. 12-16, 2009, pp. 1-5.
3rd Generation Partnership Project (3GPP), R1-090284, "RACH Procedure for Asymmetric Carrier Aggregation", Texas Instruments, 3GPP TSG RAN WG1 #55bis, Ljubljana, Slovenia, Jan. 12-16, 2008, 3 pages.
3rd Generation Partnership Project (3GPP), R1-090646, "On Component Carrier Types and Support for LTE-A Features", NEC Group, 3GPP TSG-RAN WG1 Meeting #56, Athens, Greece, Feb. 9-13, 2009, 4 pages.
3rd Generation Partnership Project (3GPP), R1-090897, "Initial Access Procedure for Asymmetric Wider Bandwidth in LTE-Advanced", NTT DoCoMo, 3GPP TSG RAN WG1 Meeting #56, Athens, Greece, Feb. 9-13, 2009, 5 pages.
3rd Generation Partnership Project (3GPP), R1-091503, "Anchor Component Carrier and Preferred Control Signal Structure", Fujitsu, 3GPP TSG-RAN1 #56bis, Seoul, ROK, Jan. 23-27, 2009, 5 pages.
3rd Generation Partnership Project (3GPP), R2-084403, "Cell Search and Association with Carriers", QUALCOMM Europe, 3GPP TSG-RAN WG2 Meeting #63, Jeju Island, Korea, Aug. 18-22, 2008, 4 pages.
3rd Generation Partnership Project (3GPP), R2-084631, "Measurement Scheme Consideration of Dual-Cell Mobility", Huawei, 3GPP TSG RAN WG2 Meeting #63, Jeju, Korea, Aug. 18-22, 2008, 5 pages.
3rd Generation Partnership Project (3GPP), Tdoc GP-061329, "Encoding Frequency Parameters for Dual Carrier Assignments", Siemens, 3GPP TSG GERAN#30, Lisbon, Portugal, Jun. 26-30, 2006, 3 pages.
3rd Generation Partnership Project (3GPP), TS 25.211 V8.2.0, "Technical Specification Group Radio Access Network, Physical Channels and Mapping of Transport Channels onto Physical Channels (FDD) (Release 8)", Sep. 2008, pp. 1-56.
3rd Generation Partnership Project (3GPP), TS 25.211 V8.5.0, "Technical Specification Group Radio Access Network, Physical Channels and Mapping of Transport Channels onto Physical Channels (FDD) (Release 8)", Sep. 2009, pp. 1-56.
3rd Generation Partnership Project (3GPP), TS 25.211 V9.0.0, "Technical Specification Group Radio Access Network, Physical Channels and Mapping of Transport Channels onto Physical Channels (FDD) (Release 9)", Sep. 2009, pp. 1-56.
3rd Generation Partnership Project (3GPP), TS 25.308 V8.3.0, "Technical Specification Group Radio Access Network, High Speed Downlink Packet Access (HSDPA), Overall Description, Stage 2 (Release 8)", Sep. 2009, pp. 1-56.
3rd Generation Partnership Project (3GPP), TS 25.308 V8.7.0, "Technical Specification Group Radio Access Network, High Speed Downlink Packet Access (HSDPA), Overall Description, Stage 2 (Release 8)", Sep. 2009, pp. 1-65.
3rd Generation Partnership Project (3GPP), TS 25.308 V9.1.0, "Technical Specification Group Radio Access Network, High Speed Downlink Packet Access (HSDPA), Overall Description, Stage 2 (Release 9)", Sep. 2009, pp. 1-65.
3rd Generation Partnership Project (3GPP), TS 36.211 V10.0.0, "Technical Specification Group Radio Access Network, Evolved Universal Terrestrial Radio Access (E-UTRA), Physical Channels and Modulation (Release 10)", Dec. 2010, pp. 103.
3rd Generation Partnership Project (3GPP), TS 36.211 V8.5.0, "Technical Specification Group Radio Access Network, Evolved Universal Terrestrial Radio Access (E-UTRA), Physical Channels and Modulation (Release 8)", Dec. 2008, pp. 1-82.
3rd Generation Partnership Project (3GPP), TS 36.211 V9.0.0, "Technical Specification Group Radio Access Network, Evolved Universal Terrestrial Radio Access (E-UTRA), Physical Channels and Modulation (Release 9)", Dec. 2009, pp. 1-85.
3rd Generation Partnership Project (3GPP), TS 36.212 V10.0.0, "Technical Specification Group Radio Access Network, Evolved Universal Terrestrial Radio Access (E-UTRA), Multiplexing and Channel Coding (Release 10)", Dec. 2010, pp. 1-72.
3rd Generation Partnership Project (3GPP), TS 36.213 V10.0.0, "Technical Specification Group Radio Access Network, Evolved Universal Terrestrial Radio Access (E-UTRA), Physical Layer Procedures (Release 10)", Dec. 2010, pp. 1-98.
3rd Generation Partnership Project (3GPP), TS 36.213 V8.4.0, "Technical Specification Group Radio Access Network, Evolved Universal Terrestrial Radio Access (E-UTRA), Physical Layer Procedures (Release 8)", Sep. 2008, pp. 1-60.
3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, pp. 1-74.
3rd Generation Partnership Project (3GPP), TS 36.213 V9.0.1, "Technical Specification Group Radio Access Network, Evolved Universal Terrestrial Radio Access (E-UTRA), Physical Layer Procedures (Release 9)", Dec. 2009.
3rd Generation Partnership Project (3GPP), TS 36.300 V10.0.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 10)", Jun. 2010, pp. 1-183.
3rd Generation Partnership Project (3GPP), TS 36.321 V10.0.0, "Technical Specification Group Radio Access Network, Evolved Universal Terrestrial Radio Access (E-UTRA), Medium Access Control (MAC) Protocol Specification (Release 10)", Dec. 2010, pp. 1-53.

(56) References Cited

OTHER PUBLICATIONS

3rd Generation Partnership Project (3GPP), TS 36.321 V8.3.0, "Technical Specification Group Radio Access Network, Evolved Universal Terrestrial Radio Access (E-UTRA) Medium Access Control (MAC) Protocol Specification (Release 8)", Sep. 2008, pp. 1-36.

3rd Generation Partnership Project (3GPP), TS 36.321 V8.7.0, "Technical Specification Group Radio Access Network, Evolved Universal Terrestrial Radio Access (E-UTRA) Medium Access Control (MAC) Protocol Specification (Release 8)", Sep. 2009, pp. 1-47.

3rd Generation Partnership Project (3GPP), TS 36.331 V10.0.0, "Technical Specification Group Radio Access Network, Evolved Universal Terrestrial Radio Access (E-UTRA), Radio Resource Control (RRC), Protocol Specification (Release 10)", Dec. 2010, pp. 1-276.

3rd Generation Partnership Project (3GPP), TS 36.331 V8.3.0, "Technical Specification Group Radio Access Network, Evolved Universal Terrestrial Radio Access (E-UTRA) Radio Resource Control (RRC), Protocol Specification (Release 8)", Sep. 2008, pp. 1-178.

3rd Generation Partnership Project (3GPP), TS 36.331 V8.7.0, "Technical Specification Group Radio Access Network, Evolved Universal Terrestrial Radio Access (E-UTRA) Radio Resource Control (RRC), Protocol Specification (Release 8)", Sep. 2009, pp. 1-208.

Lim et al., "Channel-Dependent Scheduling of Uplink Single Carrier FDMA Systems", Wireless Communications and Networking Conference, IEEE, Mar. 31, 2008, 5 pages.

Linghua, Jin, "Research on VoIP Capacity Based on HSUPA System", Wanfang Academic Journal Database, Feb. 29, 2008, 5 pages.

Mouly et al, "The Frequency Axis", The GSM System for Mobile Communications—Slow Frequency Hopping SFH, Jan. 1993, 11 pages.

Yu, Feng, "Technical Research of HARQ in HSUPA System", Wanfang Academic Journal Database, Nov. 21, 2007, 59 pages.

Zoran et al., "Performance and Implementation of Dynamic Frequency Hopping in Limited-Bandwidth Cellular Systems", IEEE Transactions on Wireless Communications, IEEE Service Center, vol. 1, No. 1, Jan. 2002, pp. 28-36.

\* cited by examiner

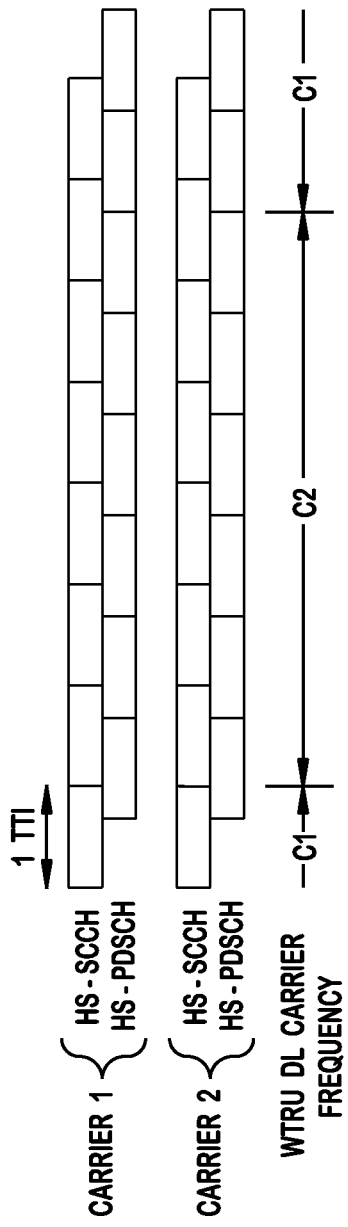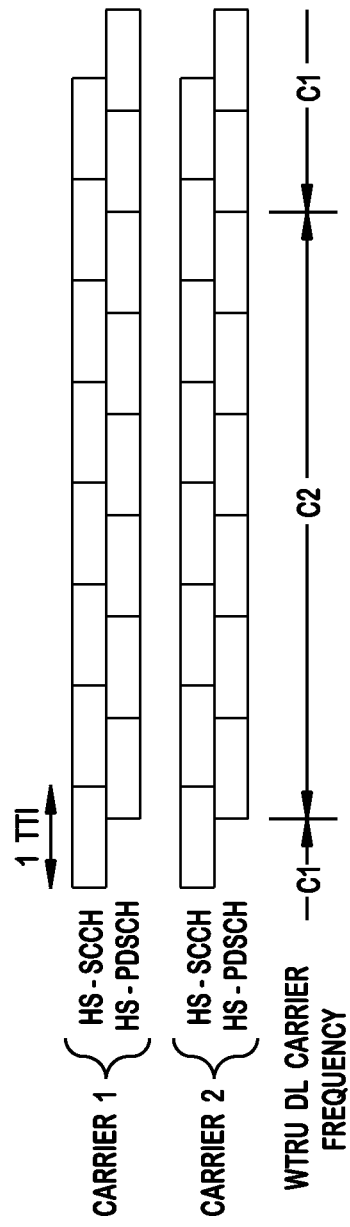

METHOD AND APPARATUS FOR UTILIZING MULTIPLE CARRIERS IN HIGH SPEED PACKET ACCESS COMMUNICATIONS TECHNICAL FIELD

CROSS REFERENCE TO RELATED APPLICATIONS

This application is a continuation of U.S. patent application Ser. No. 15/369,233, filed Dec. 5, 2016, which is a continuation of U.S. patent application Ser. No. 14/817,988, filed Aug. 4, 2015, which issued as U.S. Pat. No. 9,549,402 on Aug. 4, 2015, which is a continuation of U.S. patent application Ser. No. 14/315,388, filed Jun. 26, 2014, which issued as U.S. Pat. No. 9,137,792 on Sep. 15, 2015, which is a conituation of U.S. patent application Ser. No. 13/630,285, filed Sep. 28, 2012, which issued as U.S. Pat. No. 8,804,524 on Aug. 12, 2014, which is a continuation of U.S. patent application Ser. No. 12/610,284, filed Oct. 31, 2009, which issued as U.S. Pat. No. 8,305,998 on Nov. 6, 2012; which claims the benefit of U.S. provisional application No. 61/110,118 filed Oct. 31, 2008, which is incorporated by reference as if fully set forth herein.

FILED OF INVENTION

This application is related to wireless communications.

BACKGROUND

Dual-cell high speed downlink packet access (DC-HSDPA) has been introduced in the Release 8 specifications of the third generation partnership project (3GPP) for universal mobile telecommunication systems (UMTS). With this feature, base stations (also referred to as Node-Bs) communicate to wireless transmit/receive units (WTRUs) over two distinct carriers simultaneously. It not only doubles the bandwidth and the peak data rate available to the WTRUs, it also has a potential to increase the network efficiency by means of fast scheduling and fast channel feedback over two downlink carriers.

FIG. 1 shows a medium access control (MAC) architecture for DC-HSDPA operations. The MAC layer architecture of DC-HSDPA includes one hybrid automatic repeat request (HARQ) entity per high speed downlink shared channel (HS-DSCH). This implies that HARQ retransmissions take place over the same transport channel and thus somewhat restricts the benefit of frequency diversity potentially brought by the use of more than one downlink carrier if each HS-DSCH has a fixed mapping to physical channel resources. However, it has been suggested that the mapping between the HS-DSCH and the physical resources (codes and carrier frequency) may be dynamically modified in order to provide a diversity benefit.

SUMMARY OF THE INVENTION

A method and an apparatus for utilizing multiple carriers are disclosed. A WTRU capable of receiving on a single downlink carrier at a time may tune the receiver to one downlink carrier and switch the downlink carrier in accordance with a configured pattern. The WTRU may switch the carrier from an anchor carrier to a non-anchor carrier at a high speed shared control channel (HS-SCCH) sub-frame boundary, and switch back at an end of a subsequent high speed physical downlink shared channel (HS-PDSCH) sub-frame. The WTRU may switch the carrier at an HS-PDSCH sub-frame boundary. A WTRU capable of receiving on multiple downlink carriers simultaneously may tune the receiver to an anchor carrier and a supplementary carrier, and switch the supplementary carrier to another carrier based on a carrier switching order. The carrier switching order may be received via an HS-SCCH or via layer 2 signaling.

BRIEF DESCRIPTION OF THE DRAWINGS

A more detailed understanding may be had from the following description, given by way of example in conjunction with the accompanying drawings wherein:

FIG. 4 shows example carrier switch timing in accordance with one embodiment;

FIG. 5 shows example carrier switch timing in accordance with another embodiment;

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, a machine-to machine (M2M) device, a sensor, or any other type of device capable of operating in a wireless environment. When referred to hereafter, the terminology "Node-B" includes but is not limited to a base station, a site controller, an access point (AP), or any other type of interfacing device capable of operating in a wireless environment.

The network may assign at least one downlink and/or at least one uplink carrier as an anchor downlink carrier and an anchor uplink carrier, respectively. For example, the anchor carrier may be defined as the carrier for carrying a specific set of control information for downlink/uplink transmissions. Any carrier that is not assigned as an anchor carrier is a supplementary carrier. Alternatively, the network may not assign an anchor carrier and no priority, preference, or default status may be given to any downlink or uplink carriers. For multi-carrier operation more than one supplementary carriers or supplementary carriers may exist.

Figure 1:
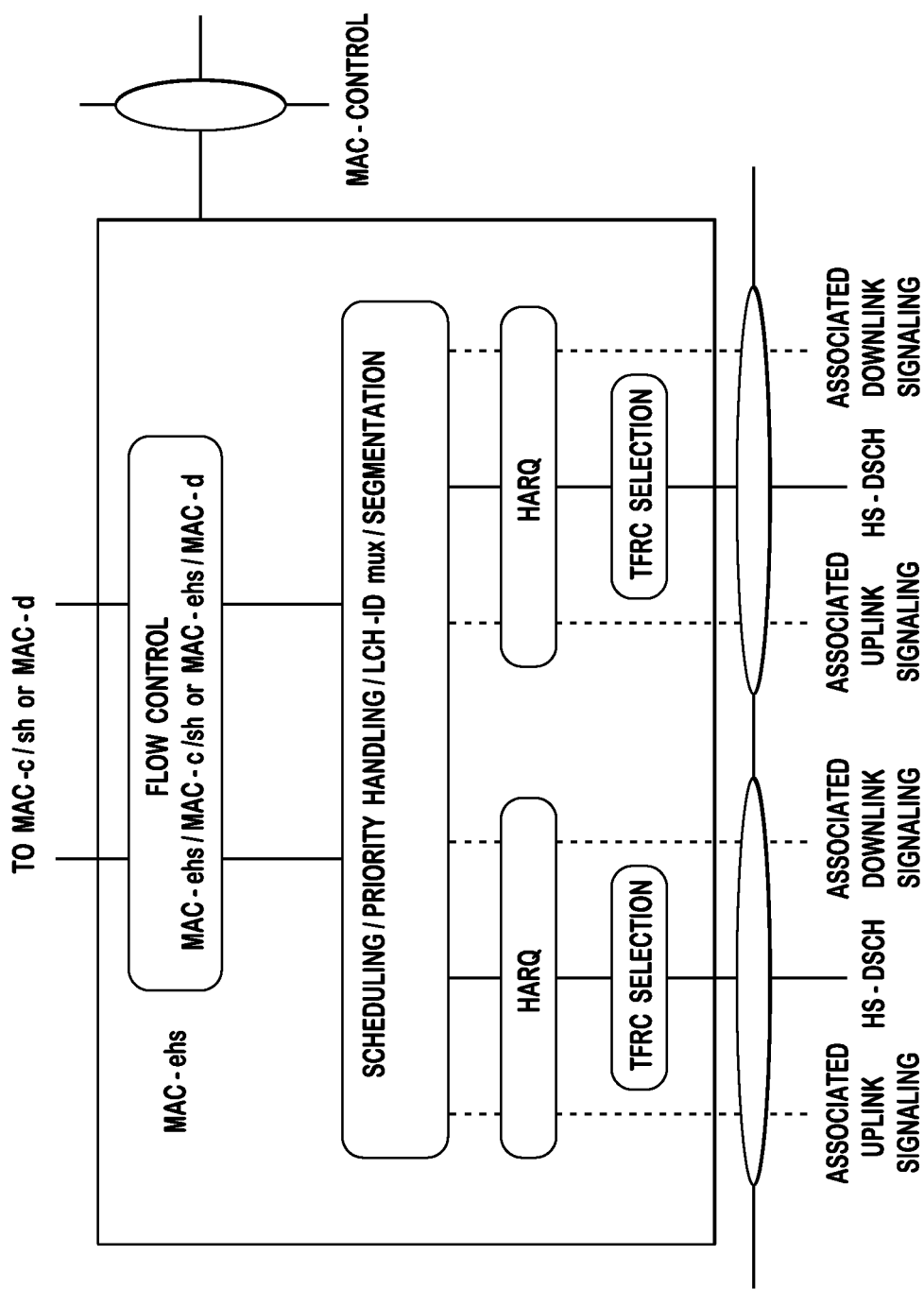
FIG. 1 shows a medium access control (MAC) architecture for DC-HSDPA operations.
Figure 2:
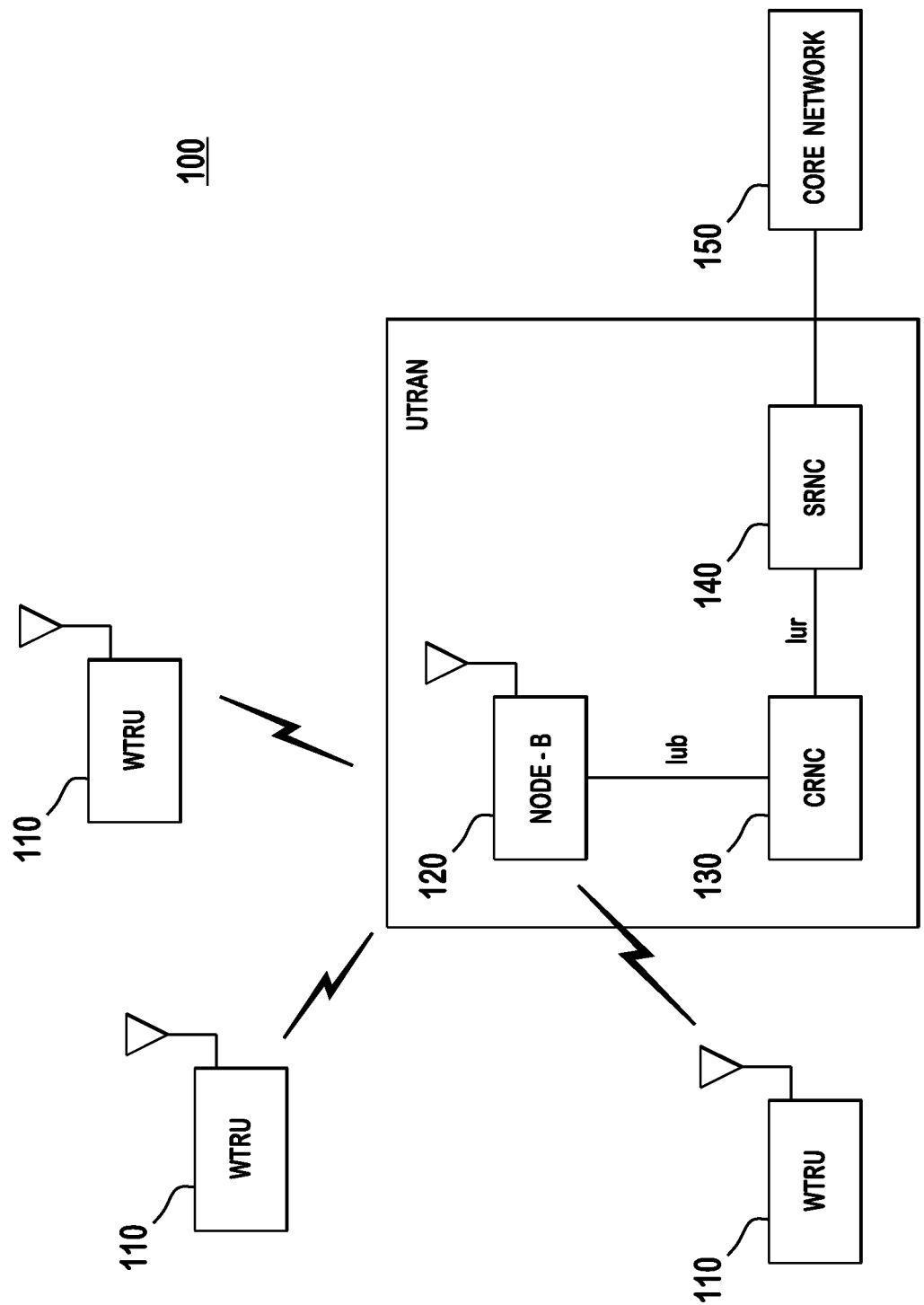
FIG. 2 shows a wireless communication system.

FIG. 2 shows a wireless communication system 100 including a plurality of WTRUs 110, a Node B 120, a controlling radio network controller (CRNC) 130, a serving radio network controller (SRNC) 140, and a core network 150. The Node B 120 and the CRNC 130 may collectively be referred to as the universal terrestrial radio access network (UTRAN).

As shown in FIG. 2, the WTRUs 110 are in communication with the Node B 120, which is in communication with the CRNC 130 and the SRNC 140. Although three WTRUs 110, one Node B 120, one CRNC 130, and one SRNC 140 are shown in FIG. 2, it should be noted that any combination of wireless and wired devices may be included in the wireless communication system 100.

Figure 3:
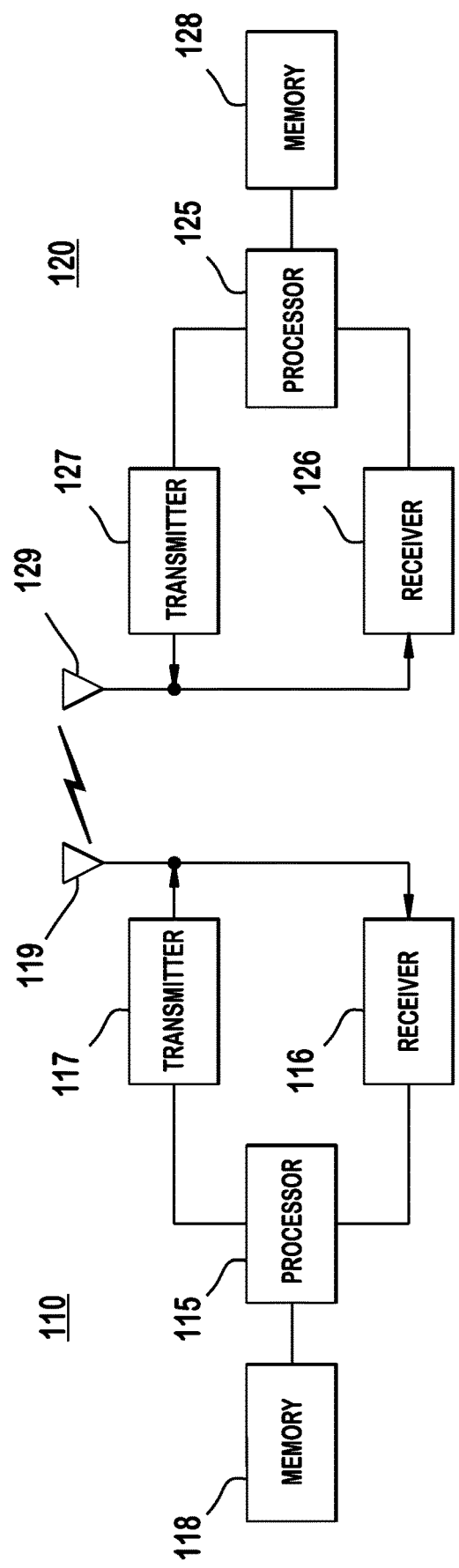
FIG. 3 is a functional block diagram of a WTRU and the Node-B of the wireless communication system of FIG. 2.

FIG. 3 is a functional block diagram of a WTRU 110 and the Node B 120 of the wireless communication system 100 of FIG. 2. As shown in FIG. 3, the WTRU 110 is in communication with the Node B 120 and both are configured to perform a method of utilizing multiple carriers in high speed packet access system.

The WTRU 110 includes a processor 115, a receiver 116, a transmitter 117, a memory 118, and an antenna 119, and other components (not shown) that may be found in a typical WTRU. The memory 118 is provided to store software including operating system, application, etc. The processor 115 is provided to perform, alone or in association with the software, a method of utilizing multiple carriers in high speed packet access system in accordance with embodiments disclosed below. The receiver 116 may be capable of receiving via only one downlink carrier at a time or via multiple downlink carriers simultaneously. Alternatively, the WTRU 110 may include multiple receivers for reception via multiple downlink carriers simultaneously. The receiver 116 and the transmitter 117 are in communication with the processor 115. The antenna 119 is in communication with both the receiver 116 and the transmitter 117 to facilitate the transmission and reception of wireless data.

The Node B 120 includes a processor 125, a receiver 126, a transmitter 127, a memory 128, and an antenna 129, and other components (not shown) that may be found in a typical base station. The processor 125 is configured to support a method of utilizing multiple carriers in high speed packet access system in accordance with embodiments disclosed below. The receiver 126 and the transmitter 127 are in communication with the processor 125. The antenna 129 is in communication with both the receiver 126 and the transmitter 127 to facilitate the transmission and reception of wireless data.

Embodiments for multi-carrier operation with a receiver capable of operating with a single carrier at a time are explained hereafter. A WTRU is capable of receiving on a single downlink carrier at a given time. There may be a single HS-DSCH. The downlink carrier associated to this HS-DSCH may change dynamically on a subframe basis. The WTRU reads a subset of downlink control channels from one specific downlink carrier, (i.e., "anchor carrier"). This subset of control channels includes a fractional downlink physical channel (F-DPCH), an E-DCH absolute grant channel (E-AGCH), an E-DCH relative grant channel (E-RGCH), an E-DCH HARQ indicator channel (E-HICH). The other physical channels, such as a common pilot channel (CPICH), a high-speed shared control channel (HS-SCCH) and a high-speed physical downlink shared channel (HS-PDSCH), may be transmitted on any downlink carrier.

In accordance with one embodiment, the change of downlink carrier may follow a pre-determined pattern or a pattern signaled from a higher layer. For example, each downlink carrier may be used every other subframe, or each downlink carrier may be used in alternation for two consecutive subframes. Such change of downlink carrier allows the network (Node-B) scheduler to schedule HARQ retransmissions in a downlink carrier different from the one used for the initial HARQ transmission, thus providing a frequency diversity gain. It is not required that all downlink carriers be used equally frequently.

There are different possibilities for the exact time that the downlink carrier is switched. Since all the downlink control channels may not be synchronized on a subframe basis, the information from some control channels of the anchor carrier may be lost for certain subframes since a fraction of the sub-frame can be listened to, unless the Node-B switches the downlink carrier for these channels as well.

In accordance with one embodiment, the WTRU may switch its downlink carrier from the anchor carrier to the non-anchor carrier (i.e., supplementary carrier) at the HS-SCCH sub-frame boundary and switch back at the end of a subsequent HS-PDSCH subframe. FIG. 4 shows example carrier switch timing in accordance with this embodiment. In this case, the WTRU misses the last E-AGCH, E-RGCH, and E-HICH subframe that start before the switch to the non-anchor carrier and all subsequent E-AGCH, E-RGCH, and E-HICH subframes up to and including the subframe that start before the end of the last HS-PDSCH subframe on the non-anchor carrier. In addition, the last HS-SCCH subframe on the non-anchor carrier that starts before the end of the last HS-PDSCH subframe is also lost.

In accordance with another embodiment, the WTRU may switch its downlink carrier at the HS-PDSCH sub-frame boundary. FIG. 5 shows example carrier switch timing in accordance with this alternative embodiment. Given the two-slots offset between the HS-SCCH sub-frame and its corresponding HS-PDSCH sub-frame, the Node-B may transmit the first two slots of the HS-SCCH subframe on the pre-switch carrier and transmit the last slot of the HS-SCCH subframe on the post-switch carrier. One advantage of this embodiment is that the WTRU does not miss an HS-DSCH sub-frame when it switches from one carrier to another. In addition, since the E-AGCH subframe boundary is synchronized with the HS-PDSCH subframe boundary, loss of E-AGCH subframes is minimized.

Figure 6:
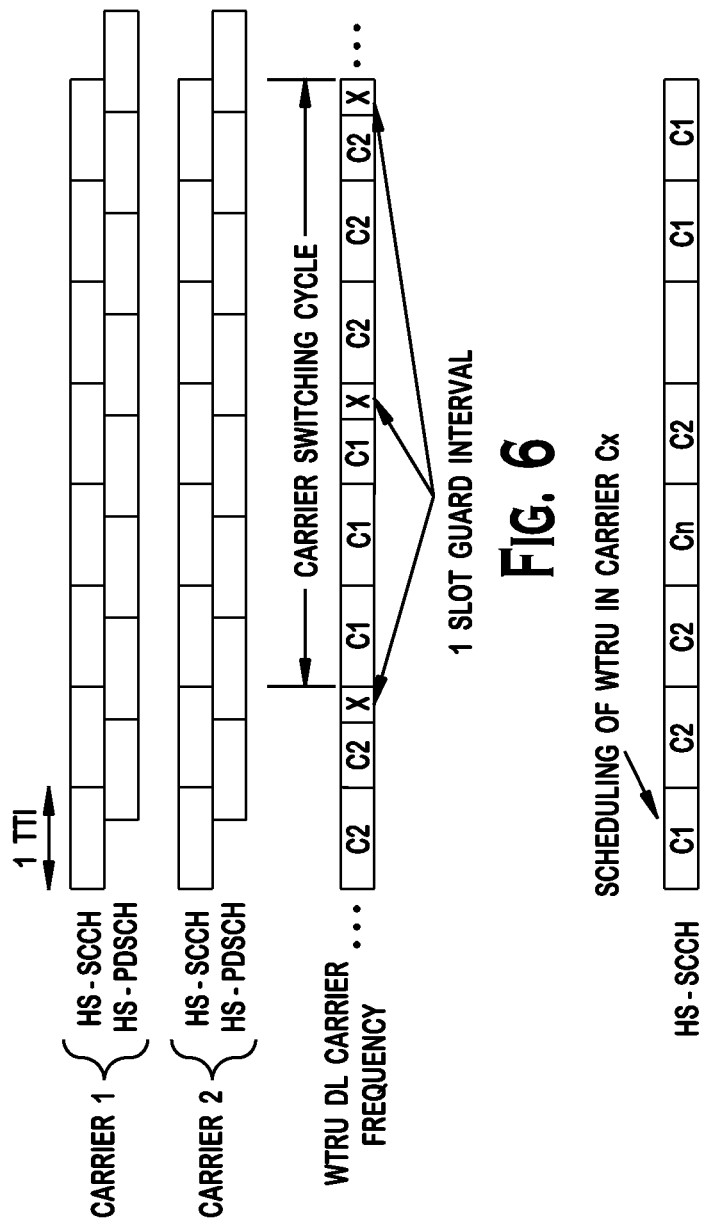
FIG. 6 shows an example downlink carrier switching with two downlink carriers with one radio slot of guard intervals.

Alternatively, a guard interval may be included before every carrier switching. This guard interval may be necessary to allow the receiver to tune and synchronize to the newly selected downlink carrier. During this guard interval, the WTRU may not receive any control or data messages from any Node-B. FIG. 6 shows an example downlink carrier switching with two downlink carriers with one radio slot of guard intervals and a carrier switching cycle of 6 TTIs.

This guard interval may be predefined. This guard interval may have a duration of one radio slot to maintain the existing timing among data and control channels. Alternatively, the network may configure the WTRU with a specific guard interval, which may be cell-specific.

The timing or behavior of the various downlink control channels needs to be modified to take into consideration the guard intervals. In particular, the E-HICH has a strict timing to comply to. When the E-HICH is transmitted during a guard interval, the WTRU misses that interval from the transmitted signal. In order to mitigate the impact of this missing radio slot, the network may transmit the E-HICH with a higher power when the network knows that the E-HICH transmission will fall during a guard interval (similar to the compress mode gaps in the uplink). Alternatively, the WTRU may not expect an E-HICH during the guard interval and interprets the missing E-HICH as a negative acknowledgement (NACK) and therefore systematically performs a HARQ retransmission. Optionally, the additional HARQ retransmission may be performed regardless of the maximum number of HARQ retransmissions allowed for that HARQ process. Alternatively, the WTRU may not transmit in a HARQ process that is known to have its corresponding E-HICH fall during a guard interval.

Since there is one HS-DSCH transmission for a given sub-frame, there is no ambiguity with the HARQ positive acknowledgement (ACK)/negative acknowledgement (NACK) transmission, and the timing and format of the HARQ ACK/NACK information may take place as in the conventional procedure.

The WTRU needs to report a channel quality indicator (CQI) of all downlink carriers. The WTRU may report the CQI for one downlink carrier in each HS-DPCCH subframe. The downlink carrier for which the CQI is reported is the carrier that the WTRU is receiving on according to the pattern for an HS-PDSCH subframe that is received X ms later or earlier. The WTRU evaluates the CQI by measuring the CPICH during the subframe received X ms earlier on the corresponding carrier.

Alternatively, the WTRU may report the CQI for more than one carrier in each HS-DPCCH subframe. For instance, if there are two downlink carriers (including the anchor carrier) the WTRU may report two CQIs.

The WTRU may in principle transmit continuously on the uplink since the uplink carrier is not switched. However, the downlink control channels required to control the uplink transmissions, (e.g., F-DPCH, E-AGCH, E-HICH, E-RGCH, etc.), that are transmitted on the anchor carrier may not be available for all subframes since the WTRU may be receiving sometimes on a non-anchor carrier. The WTRU may not transmit an E-DCH during subframes for which the corresponding E-AGCH, E-RGCH, or E-HICH subframes (as per the conventional timing relationship) are not received. Alternatively, the WTRU may be allowed to transmit non-scheduled transmissions on an E-DCH during subframes for which the corresponding E-AGCH subframes are not received. In a case where the E-HICH subframe is not received, the WTRU may be allowed to retransmit a MAC-e or MAC-i protocol data unit (PDU) as if a HARQ NACK had been transmitted over the E-HICH. Alternatively, the WTRU may be allowed to transmit the DPCCH, HS-DPCCH, E-DPCCH or E-DPDCH if the F-DPCH was received a certain number of slots earlier.

With respect to MAC architecture, eight (or in general N, N being an integer) HARQ processes may be configured that may be used across all downlink carriers. This would allow HARQ retransmissions on different carriers and simplify signaling mechanisms.

Embodiments for multi-carrier operation with a receiver capable of operating with two carriers simultaneously are explained hereafter. The embodiments equivalently apply to a WTRU equipped with two receivers operating simultaneously, each being capable of receiving on a single carrier. It should be noted that the embodiments are also applicable to WTRUs with a receiver having a capability of processing on more than two carriers simultaneously, or a WTRU with multiple receivers for receiving multiple carriers. The following embodiments may apply to an evolved HSPA system and WTRU. They may also apply to a LTE-advanced (LTE-A) system and WTRU. In the case of an LTE or LTE-A system, the downlink control channels physical downlink control channel (PDCCH) and physical HARQ indicator channel (PHICH) together may be used in place of a set of F-DPCH, E-AGCH, E-RGCH and E-HICH. In addition, in an LTE or LTE-A system, the physical channels PDCCH and physical downlink shared channel (PDSCH) may be used in place of the HS-SCCH and HS-PDSCH, respectively. In addition, in an LTE or LTE-A system, a cell radio network temporary identity (C-RNTI) may be used in place of the H-RNTI or E-RNTI.

A subset of downlink control channels, (e.g., F-DPCH, E-AGCH, E-RGCH, E-HICH), may be received on the anchor carrier. Other downlink control or data physical channels, such as HS-SCCH and/or HS-PDSCH, may be received from any downlink carrier. The receiver of the WTRU is tuned to the anchor carrier to ensure proper reception of the control channels. The receiver may also be tuned to any other downlink carrier at any given time in order to receive downlink traffic over the HS-DSCH. Alternatively, the receiver may be tuned to any two or more carriers.

The WTRU monitors the F-DPCH, E-AGCH, E-RGCH, and E-HICH from the anchor carrier. The WTRU monitors the HS-SCCH and HS-PDSCH on more than one (Nc) downlink carriers according to the mapping between the Nc HS-DSCH transport channels and the downlink carriers.

Upon radio resource control (RRC) connection setup or upon transitioning to the CELL_DCH state, the network configures the WTRU with the Nc downlink carrier information. More specifically, the network may configure, but is not limited to, the CPICH information, HS-DSCH radio network temporary identity (H-RNTI), HS-SCCH frequency information, and other parameters that may be required. The H-RNTI and HS-SCCH may not need to be configured for all carriers. A different set of parameters may be configured for LTE, LTE-A, or other types of systems.

The change of downlink carrier may follow a pre-determined pattern or a pattern signaled from a higher layer. There may be at least one HS-DSCH mapped to the anchor carrier at a given time. This allows for continuous reception of the F-DPCH, E-AGCH, E-RGCH and E-HICH and thus allows for continuous transmission on the uplink.

In accordance with another embodiment, the WTRU may perform a fast and dynamic downlink carrier switching under the control of the Node B. The scheduling of the WTRU may be signaled to the WTRU, for example, via an HS-SCCH on the anchor carrier. The WTRU may monitor one HS-SCCH on the anchor carrier to obtain the information required to decode the data (such as the code set, the modulation format, the HARQ process, redundancy version (RV), etc. and the carrier in which the data is being scheduled). In case of an LTE system, the information required to decode the data may include information pertaining to the allocated sub-carriers as per the used downlink control information (DCI) format of the PDCCH. This removes the requirement from the WTRU to monitor the HS-SCCH of different carriers. The WTRU may monitor the HS-SCCH on the anchor carrier and move directly to the HS-PDSCH of the indicated downlink carrier. In the LTE case, the WTRU may monitor the PDCCH on the anchor carrier and move directly to the PDSCH of the indicated downlink carrier.

In order to signal the carrier information, an additional bit(s) may be included in the HS-SCCH to explicitly indicate the carrier number (i.e., an index to the downlink carrier). Alternatively, the carrier information may be implicitly indicated, for example via the use of different H-RNTI. More specifically, the network may configure a different H-RNTI for each downlink carrier. Upon decoding the H-RNTI in the HS-SCCH, the WTRU determines the downlink carrier associated with the decoded H-RNTI in which to monitor the HS-PDSCH. Alternatively, the carrier information may be indicated by the HS-SCCH code number such that a different channelization code may implicitly indicate the downlink carrier number. Alternatively, the carrier information may be indicated by the HARQ process number. HARQ processes may be allocated per downlink carrier and depending on the HARQ process signaled on the HS-SCCH the WTRU may detect which downlink carrier it corresponds to.

Figure 7:
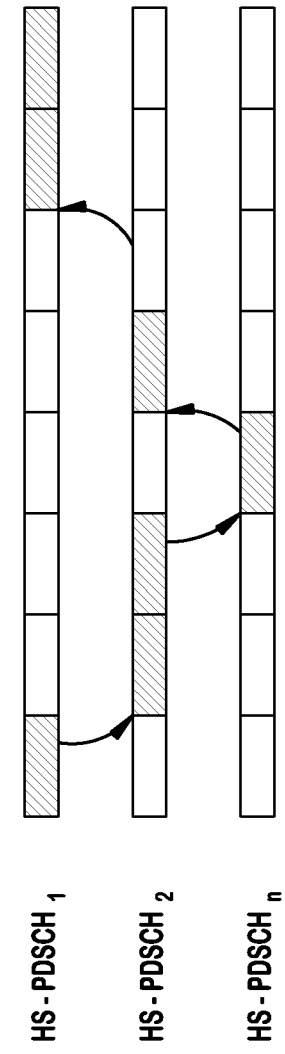
FIG. 7 shows an example fast dynamic carrier scheduling over the HS-SCCH in accordance with one embodiment.

Since the time to switch the receiver from one frequency to another may not be instantaneous, for correct reception of data, the HS-SCCH may indicate the information X TTIs or slots in advance, where X may be equal to 0 (i.e., same timing as for current systems is maintained) or any arbitrary value predefined or signaled by the network. FIG. 7 shows an example fast dynamic carrier scheduling over the HS-SCCH in accordance with this embodiment, where X is set to zero. If a different timing requirement is set, the WTRU may start monitoring the HS-PDSCH X slots or TTI after the reception of the HS-SCCH. In case of an LTE system, the WTRU may start monitoring the PDSCH X slots or TTIs after the reception of the PDCCH.

In FIG. 7, the downlink carrier scheduling information is indicated via the HS-SCCH on the anchor carrier. The WTRU receives the HS-SCCH on the anchor carrier and switches the other carrier to receive the HS-PDSCH in accordance with the scheduling information received via the HS-SCCH.

In the case where the WTRU may switch directly to the new carrier, (i.e., X=0), for explicit signaling the HS-SCCH Part 1 needs to contain the carrier information. This would allow the WTRU to know what downlink carrier to start monitoring the applicable HS-PDSCH codes. If X TTI or slot delay (X.gtoreq.1) is applied to monitor the HS-DPSCH, the carrier information may be contained in Part 2 as well. This would allow the WTRU to fully decode the three time slots of the HS-SCCH.

For this embodiment, since the WTRU is monitoring the anchor carrier, the network may schedule the WTRU on the HS-PDSCH of the anchor carrier and additionally on the HS-PDSCH of other carrier(s). This may be done with the use of two H-RNTIs, one H-RNTI for the anchor carrier and the other H-RNTI for other carriers. Alternatively, two sets of HS-SCCH codes may be used, or two sets of HARQ processes may be configured. For instance, the first eight HARQ processes may be used for the anchor carrier, and the other set of HARQ processes may be shared among other carriers. Explicit carrier signaling may also be used, and the network may schedule the WTRU on two downlink carriers in the same TTI using two different HS-SCCH codes.

In accordance with another embodiment, the WTRU may perform slower dynamic switching under the control of the Node-B. The slower dynamic switching may be controlled by L1 or L2 signaling in the anchor cell or alternatively in any of the other cells the WTRU is monitoring.

Figure 8:
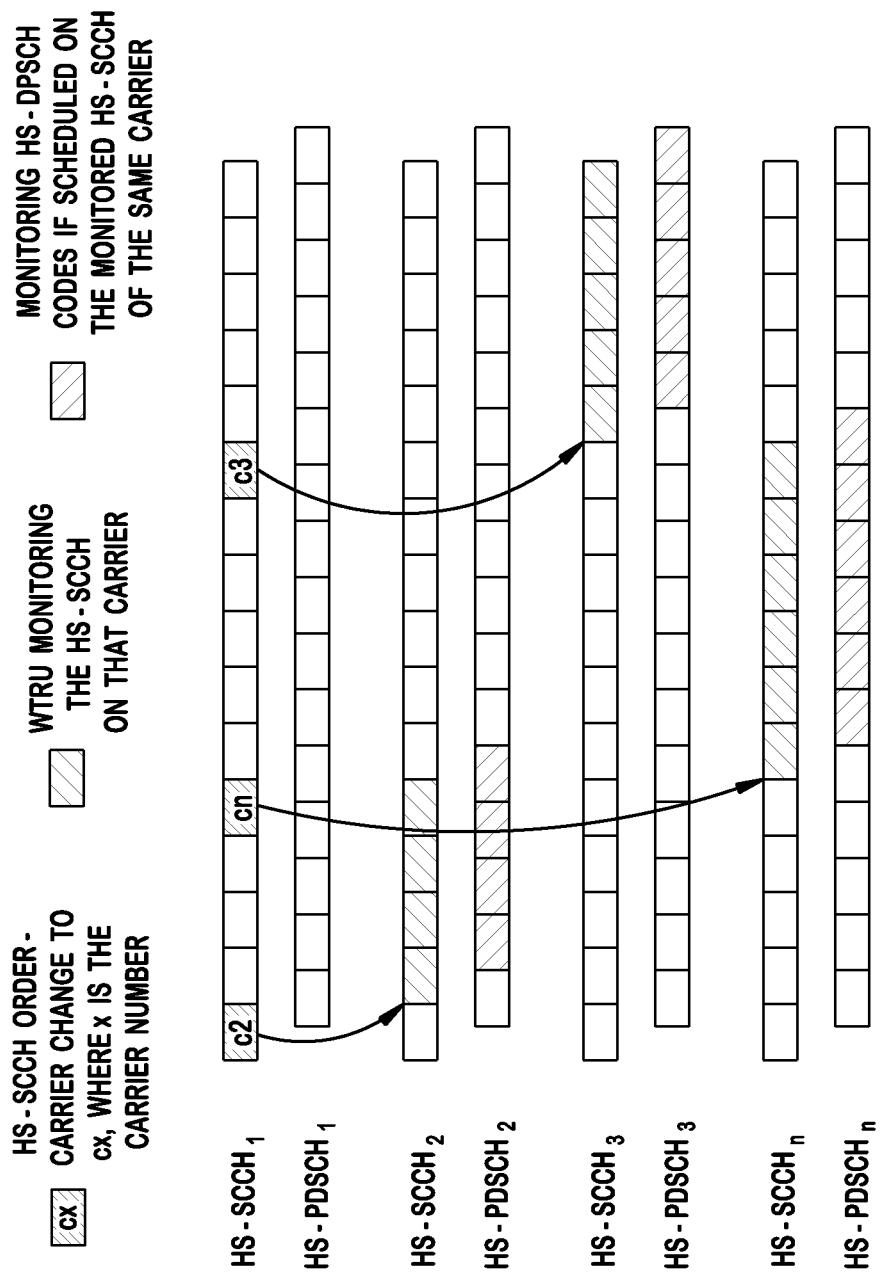
FIG. 8 shows an example of slower dynamic carrier scheduling using an HS-SCCH order.

An HS-SCCH order may be used to indicate the downlink carrier the WTRU should switch to. The HS-SCCH order may include an order bit(s) for carrier switching and an information bit(s) to indicate the downlink carrier number the WTRU should start monitoring. Upon reception of the HS-SCCH order the WTRU switches to the indicated downlink carrier, X slots or TTIs after the reception of the HS-SCCH order, where X may be 0 or any other predefined or configured value (e.g., 12 slots) and monitoring the HS-SCCH on the indicated downlink carrier. The WTRU may continue to monitor the HS-SCCH and the HS-PDSCH on the carrier until another order is received on the anchor carrier or on the supplementary carrier. FIG. 8 shows an example of slower dynamic carrier scheduling using an HS-SCCH order, where the HS-SCCH orders are provided in the anchor carrier and X is equal to 0. In FIG. 8, the WTRU switches the supplementary carrier to carrier 2 (C2) to carrier n (Cn) to carrier 3 (C3) as the HS-SCCH order on the anchor carrier indicates.

Alternatively, the HS-SCCH order for carrier change may be provided in the supplementary carrier. In that case, for example, the WTRU receives an HS-SCCH order for carrier switch on carrier 2 and switches to carrier n after X slots or TTIs, and receives an HS-SCCH order for carrier switch on carrier n and moves to carrier 3 after X slots or TTIs.

For this embodiment, the network may configure the WTRU with an H-RNTI for each carrier. When the WTRU moves to the indicated carrier it monitors the HS-SCCH for the corresponding H-RNTI. Alternatively, an H-RNTI that is common to all supplementary carriers may be assigned.

Instead of an HS-SCCH order, an L2 message may be used, (e.g., MAC-hs/ehs PDU). The carrier indication may be included in the payload of the MAC PDU or in the header part, (e.g., may be indicated by a special value of the logical channel identity (LCH-ID)).

In case where the number of downlink carriers is more than two, the receiver of the WTRU may be tuned to the anchor carrier and one (or more) of the supplementary carriers, while the supplementary carrier to be tuned is dynamically switched from one supplementary carrier to another. Alternatively, the receiver may be tuned to any two (or more) downlink carriers. The switching time for the receiver may follow one of the embodiments disclosed above; (e.g., embodiments related to FIGS. 4-6).

The ACK/NACK feedback for the supplementary carrier may be provided as in the conventional HSDPA procedures. Since the WTRU is monitoring one of the supplementary carriers at a time there is no ambiguity in the ACK/NACK feedback. Since the WTRU is monitoring the anchor carrier the CQI reporting for the anchor carrier may follow the conventional HSDPA procedure. However, in order to report the CQI of the supplementary carriers the WTRU may follow the following rules. Each carrier may have a corresponding subframe number during which the WTRU is allowed to measure and report the CQI. The network knows the mapping, (i.e., the configured subframes for each downlink carrier), and thus knows for which downlink carrier the CQI is being reported on the feedback channel. Alternatively, a strict timing between the downlink carrier in which data is received and the reporting may be defined. Alternatively, the CQI format in the HS-DPCCH may be modified to explicitly indicate the carrier number.

Since the WTRU may not be monitoring all the downlink carriers it may not be able to measure and provide CQI reports for all downlink carriers. The CQI reporting is a useful measure to help the scheduler in the network. The WTRU may be configured to measure and report when receiving data from a carrier. Alternatively, the WTRU may be configured with a measurement period to tune to each carrier and perform measurements. The pattern may be defined by the network or the measurement may be performed in accordance with a predefined formula, for example, based on the H-RNTI. The receiver may perform the measurement only on the supplementary carrier. If discontinuous reception (DRX) is configured the WTRU may use the DRX periods to take measurements.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method, implemented in a wireless transmit/receive unit (WTRU), the method comprising:
    monitoring for downlink control information (DCI) on first frequency resources;
    receiving the DCI on the first frequency resources, the DCI indicating an index associated with second frequency resources;
    switching from the first frequency resources to the second frequency resources during a switching time;
    receiving data via the second frequency resources;
    switching from the second frequency resources to the first frequency resources; and
    monitoring for DCI on the first frequency resources.

2. The method of claim 1, wherein the DCI is received on a Physical Downlink Control Channel (PDCCH).

3. The method of claim 1, wherein switching comprises tuning a receiver to the second frequency resources during the switching time.

4. The method of claim 1, wherein the data is received via the second frequency resources X number of time slots after the DCI is received via the first frequency resources, where X>0.

5. The method of claim 4, wherein the X number of time slots is signaled by a network.

6. The method of claim 1, wherein the switching time is configured by a network.

7. The method of claim 1, wherein the switching time is signaled by a network, and the switching time corresponds to a time during which the WTRU is not required to transmit to or receive from the network.

8. The method of claim 1, further comprising:
    receiving an indication of the switching time from a network.

9. The method of claim 1, further comprising:
    determining the switching time based on the DCI.

10. The method of claim 1, wherein monitoring for DCI on the first frequency resources is performed by a receiver of the WTRU that is configured to receive over a single set of frequency resources at a time.

11. A wireless transmit/receive unit (WTRU) for utilizing multiple carriers, the WTRU comprising:
    a processor configured to:
    monitor for downlink control information (DCI) on first frequency resources;
    receive the DCI on the first frequency resources, the DCI indicating an index associated with second frequency resources;
    switch from the first frequency resources to the second frequency resources during a switching time;
    receive data via the second frequency resources;
    switch from the second frequency resources to the first frequency resources; and
    monitor for DCI on the first frequency resources.

12. The WTRU of claim 11, wherein the DCI is received on a Physical Downlink Control Channel (PDCCH).

13. The WTRU of claim 11, wherein the processor is further configured to tune a receiver to the second frequency resources during the switching time to switch from the first frequency resources to the second frequency resources.

14. The WTRU of claim 11, wherein the data is received via the second frequency resources X number of time slots after the DCI is received via the first frequency resources, where X>0.

15. The WTRU of claim 14, wherein the X number of time slots is signaled by a network.

16. The WTRU of claim 11, wherein the switching time is configured by a network.

17. The WTRU of claim 11, wherein the switching time is signaled by a network, and the switching time corresponds to a time during which the WTRU is not required to transmit to or receive from the network.

18. The WTRU of claim 11, wherein the processor is further configured to receive an indication of the switching time from a network.

19. The WTRU of claim 11, wherein the processor is further configured to determine the switching time based on the DCI.

20. The WTRU of claim 11, further comprising a receiver that is configured to receive over a single set of frequency resources at a time.

* * * * *